March 27, 1956 — L. J. WINCENCIAK — 2,739,462
SHOCKPROOF GEAR
Filed June 24, 1954 — 2 Sheets-Sheet 1

INVENTOR
LEONARD J. WINCENCIAK
BY James H. Tilberry
ATTORNEY

March 27, 1956 L. J. WINCENCIAK 2,739,462
SHOCKPROOF GEAR

Filed June 24, 1954 2 Sheets-Sheet 2

INVENTOR
LEONARD J. WINCENCIAK
ATTORNEY

United States Patent Office 2,739,462
Patented Mar. 27, 1956

2,739,462

SHOCKPROOF GEAR

Leonard J. Wincenciak, Mayville, N. Y.

Application June 24, 1954, Serial No. 439,023

1 Claim. (Cl. 64—27)

This invention relates to rotary power transmitting means such as gears, pulleys, wheels, sprockets, friction drives and the like, and more particularly to such devices which are shock absorbing and sound dampening.

Gears, gear teeth and the problems of making the same have been the subject of investigations for centuries, and the development of modern gears and gear teeth represents a gradual evolution from gearing of primitive form up to the present day gear means. It is believed that the first successful solution of the problem of uniform motion from toothed gearing dates back to the middle of the seventeenth century, just prior to the dawn of the Industrial Revolution. From that time on, problems related to gears and gearing such as friction, pressure angles, thrust, wear, tooth impact, overtravel, backlash, noise and the like have been continuously studied in an effort to produce a more efficient gear. To this end, many refinements in the shape and manufacture of gears have been developed but the above recited problems still remain in varying degrees.

It is therefore an important object of this invention to provide improved power transmitting means having superior shock absorbing and sound dampening qualities.

Other objects of the invention include the provision of gear means which may be used wherever gear noise is objectionable, such as in household appliances, portable tools, hospital equipment, cameras, etc.; the provision of an improved gear having built-in compensating qualities enabling the permissible tolerances in hobbing, shaping and forming of the gear teeth to be greatly increased; the provision of an improved gear which may be manufactured with increased hobbing and cutting speeds and feeds; the provision of an improved gear which may be manufactured without the necessity of shaving, grinding or lapping the gear teeth; the provision of an improved gear in which the gear teeth are maintained in perfect concentricity with its axis of rotation even under full load, and at the same time absorbing peripheral shocks, end thrust, and substantially eliminating gear-to-gear running noise; the provision of an improved gear which will greatly exceed the life of conventional types of gears by virtue of its increased capacity to absorb sudden overloads and shocks; the provision of an improved gear in which gear clatter caused by overtravel is absorbed and side or end thrust is cushioned by resilient means; the provision of an improved two-piece gear having concentric inner and outer parts in which only the mating concentric surfaces require standard machining tolerances and the outer part requires only boring and broaching prior to hobbing; the provision of an improved precision gear which may be manufactured without the use of expensive and precise machinery and measuring instruments; the provision of a precision gear which is inexpensive to manufacture and may be used wherever power transmission is accomplished by means of a gear or train of gears; and the provision of an improved two-piece gear, the parts of which are bonded together by resilient rubber-like substance such as rubber, neoprene, synthetic plastic or the like.

To the accomplishment of the foregoing and related ends, said invention, then, consists of the means hereinafter fully described and particularly pointed out in the claims, the annexed drawings and the following description setting forth in detail certain structure embodying the invention, such disclosed means constituting, however, but some of the various forms in which the principle of the invention may be used:

Figure 1:
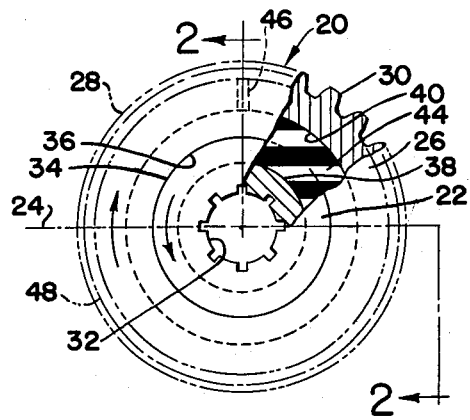
Figure 1 is a front elevational view of one embodiment of the invention with parts broken out to show the structure of the interior of the device.

In general, a simple embodiment of the invention comprises a power transmitting device such as a spur gear 20 (see Figures 1 and 2) having an inner or hub member 22 concentrically aligned on axis 24 with an outer or ring member 26. The outer periphery 28 of the ring member 26 is shown with spur gear teeth 30 machined thereon, although any known type of teeth may be used or the periphery may be adapted to serve as a sprocket, pulley, friction drive or other such related device. The inner periphery 32 of the hub member 22 is machined to fit on a splined shaft, but any other shaft-securing means may be employed such as keys and keyways, taper shafts and the like.

Opposed annular surfaces 34 and 36 of hub and ring members 22 and 26, respectively, are matched to provide a close sliding fit therebetween, and these surfaces may be machined to any required degree of accuracy by means well understood by those skilled in the art. An annular groove 38 is machined in surface 34 of hub member 22 and is aligned with an opposed annular groove 40 machined in surface 36 of ring member 26 to form a closed annular cavity 42 between hub and ring members 22 and 26. A solid core 44 of resilient rubber-like substance fills the cavity 42 and bonds the hub and ring members 22 and 26 together to permit slight elastic axial and rotational movement therebetween. The resilient substance may be either rubber or a suitable synthetic substance which can be made sufficiently plastic to enable it to be injected under pressure such as through an orifice 46 in the ring member 26 into the cavity 42, or which may be compressed in the solid state into one of the grooves 38 or 40 during assembly of hub member 22 with ring member 26. Any other suitable means known to those skilled in the art may be employed to fill the cavity 42 with a substance 44 which upon hardening will bond the hub and ring members 22 and 26 of the gear 20 together to permit the aforesaid elastic movement therebetween.

It will thus be observed that the construction of gear 20 enables the gear teeth 30 to transmit tooth impact to the core 44 where it is absorbed together with the sound caused by the impact. Also, the harmful effects of end thrust are ameliorated by the lateral resiliency between hub and ring members 22 and 26. Most significant, however, is the fact that with both tooth impact and end thrust cushioned, the precision fit of the gear is nevertheless unimpaired because the machined surfaces 34 and 36 of hub and ring members 22 and 26, respectively, maintain the critical radial dimension, such as the radius of the pitch circle and the like, within the allowable limits required for use in high precision mechanisms.

Figure 2:
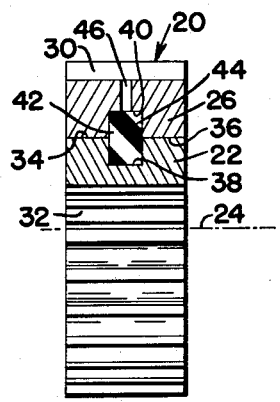
Figure 2 is an end elevational view of the embodiment of the invention shown in Figure 1 taken along the line 2—2 of Figure 1.
Figure 3:
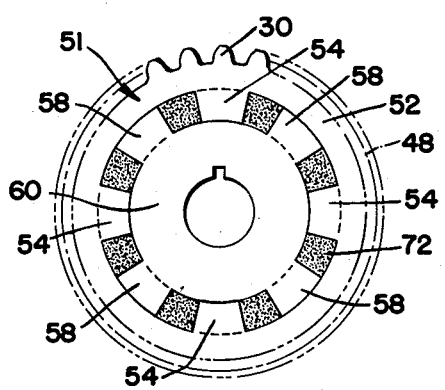
Figure 3 is a front elevational view of yet another embodiment of the invention.
Figure 4:
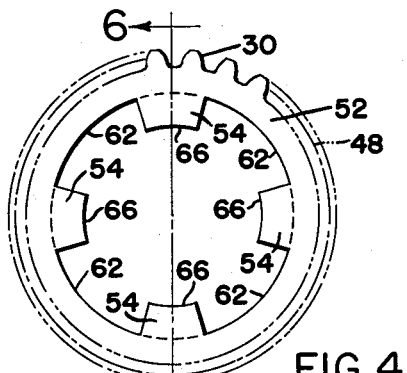
Figure 4 is a front elevational view of the outer part of the embodiment of the invention shown in Figure 3.
Figure 5:
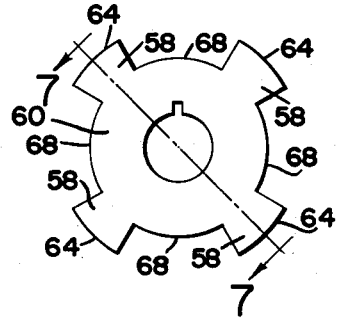
Figure 5 is a front elevational view of the inner part of the embodiment of the invention shown in Figure 3.
Figures 6, 7:
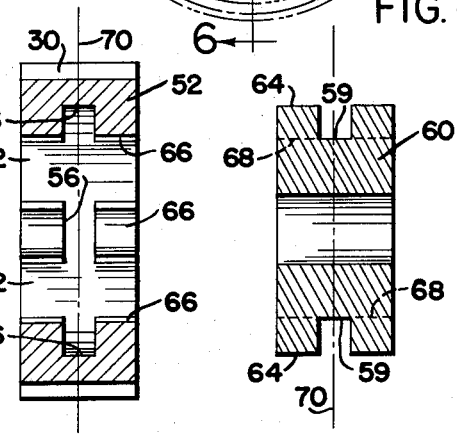
Figure 6 is a sectional view taken on the line 6—6 of Figure 4.
Figure 7 is a sectional view taken on the line 7—7 of Figure 5.
Figure 8:
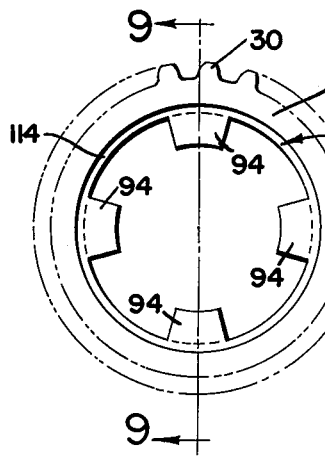
Figure 8 is a front elevational view of the outer part of still another embodiment of the invention.
Figure 9:
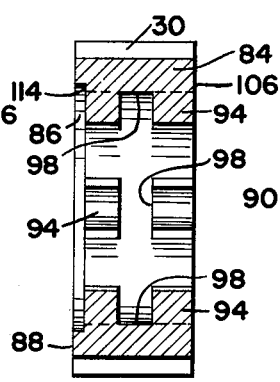
Figure 9 is a sectional view taken on the line 9—9 of Figure 8.
Figure 10:
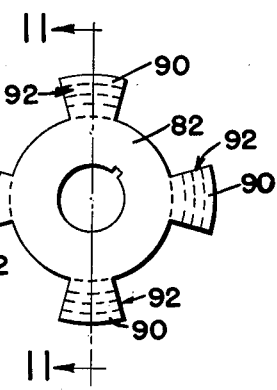
Figure 10 is a front elevational view of the inner part adapted to mate with the outer part shown in Figure 8.
Figure 11:
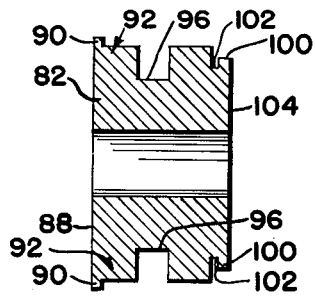
Figure 11 is a sectional view taken on the line 11—11 of Figure 10.
Figure 12:
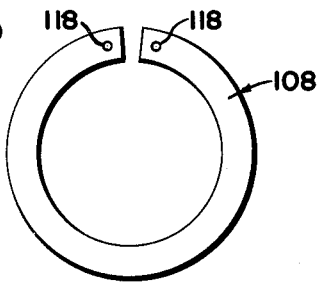
Figure 12 is a front elevational view of a retaining ring employed to prevent axial movement between the parts shown in Figures 8 and 9.
Figure 13:
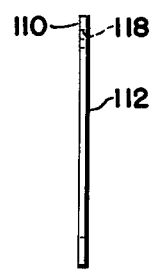
Figure 13 is an edge view of the retaining ring shown in Figure 12.

The embodiment of the invention illustrated in Figures 1 and 2 and as described hereinabove is contemplated for use in small mechanisms wherein the torque between gear members 22 and 26 is safely below the point at which the bond between the hub and ring members 22 and 26 might become ruptured. For heavier torque transmission reference is now made to the embodiment of the invention illustrated in Figures 3 to 7.

In this embodiment, ring member 52 of gear 51 is provided with inwardly and radially projecting ears 54 which are provided with slots 56. The ears 54 are spaced 90° apart to receive therebetween outwardly and radially projecting ears 58 integral with hub member 60 and also spaced 90° apart. These ears 58 are also provided with slots 59 opposed to slots 56. The critical concentric relationship between the ring and hub members 52 and 60 is maintained by carefully held tolerances between mating surfaces 62 of ring member 52 and 64 of hub member 60, and between mating surfaces 66 of ring member 52 and 68 of hub member 60. Ears 54 and 58 are aligned on center line 70 to receive alternately therebetween in slots 56 and 59 a resilient insert 72 (see Figure 3) which is bonded to surfaces 68 and adjacent surfaces of ears 58 and slots 59 of hub member 60, and to surfaces 62 and adjacent surfaces of ears 54 and slots 59 of ring member 52.

With the above set forth structure alternate portions of resilient insert 72 are in compression while the portions intermediate said alternate portions are in tension when torque is applied to the gear 51. The relatively close intervals at which the ears 54 and 58 are spaced enables the gear 51 to receive and transmit very high torque without rupturing or shearing the bond between the gear ring and hub members 52 and 60 and the resilient insert 72.

Figure 14:
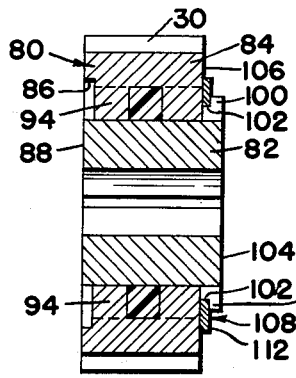
Figure 14 is a sectional view taken on the line 14—14 of Figure 15.
Figure 15:
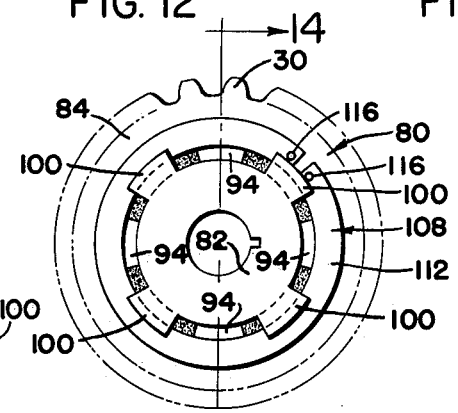
Figure 15 is an elevational assembled view of an embodiment of the invention comprising the parts shown in Figures 8 to 13.

In still another embodiment of the invention as shown in Figures 8 to 15, the hub and ring members 82 and 84, respectively, of gear 80 are adapted to interlock so as to resist end thrust in either one or both axial directions. Due to space limitations, excessive high end thrust pressures and other reasons, this embodiment of the invention has many uses.

Where it is necessary to resist end thrust in one direction only, ring member 84 is provided with a recessed annular groove 86 on one side face 88 of gear 80. Flanges 90 extend radially outwardly from ears 92 of hub member 82 to mate concentrically in groove 86, thereby preventing axial deflection to the right, as shown in Figure 14. The hub and ring members 82 and 84 are provided with ears 92 and 94, respectively, having grooves 96 and 98, respectively. The function and fit of members 82 and 84 is substantially the same as the function and fit of the parts of the gear 51, shown in Figures 3 to 7 and described hereinabove, with the exception of the aforesaid end thrust resisting groove 86 and flanges 90.

Flanges 100 and grooves 102 (see Figure 11) may also be provided on the back face 104 of the ears 92 projecting from hub member 82 in order to resist end thrust to the left, as seen in Figure 14. With the hub and ring members 82 and 84 assembled, flanges 90 are received in groove 86 and the left sides of grooves 102 lie in the same plane as face 106 of ring member 84 with flanges 100 spaced to the right of face 106 a distance equal to the width of grooves 102. A split retaining ring 106 is adapted to snugly fit into grooves 102 with face 110 bearing against the left sides of grooves 102 and face 106 of ring member 84, and with face 112 bearing against the right sides of grooves 102. Holes 118 may be provided in the ends 116 of the retaining ring 108 to assist in the assembly of the ring into grooves 102 by plier means, the use of which is well known to those skilled in the art. Thus, with flanges 90 bearing against the vertical face 114 of groove 86 and retaining ring 108 interposed between faces 106 of ring member 84 and the right vertical faces of grooves 102, the hub and ring members 82 and 84 coact to resist axial thrust either to the right or to the left.

From the foregoing it will be evident, therefore, that the above described and illustrated embodiments of the invention provide a shockproof and sound dampening gear which will give longer life than conventional solid type gears; is cheaper to manufacture because of greater permissible tolerance in hobbing and the elimination of shaving and lapping operations; will compensate for errors in helix angles; and reduces the amount of salvage work required on precision mechanisms due to noisy units caused by mismatched gears.

While herein shown and described are typical embodiments of the invention, it will be evident that the invention is susceptible of embodiment in other forms, and is applicable to a great variety of situations, without departing from the spirit or scope of the invention.

I claim:

A shock proof wheel comprising a hub member having a plurality of outwardly and radially projecting ears, an outer ring member having a plurality of inwardly and radially projecting ears, said hub ears being spaced between said ring ears to mate with the inner peripheral surface of said outer ring, said ring ears being adapted to mate with the outer peripheral surface of said hub member, and an annular ring of resilient non-resonant substance interposed between said members and on each side of said ears and bonded thereto, said ears being provided with arcuate grooves concentric about the rotational axis of said wheel, and said annular ring of resilient non-resonant substance being received within and bonded to said grooves, whereby shock received by said hub or said outer ring is cushioned by contact of said hub and ring members with said interposed annular ring of resilient nonresonant substance.

References Cited in the file of this patent

UNITED STATES PATENTS

| | | |
|---|---|---|
| 1,815,894 | Baker | July 28, 1931 |
| 2,477,175 | Gee | July 26, 1949 |

FOREIGN PATENTS

| | | |
|---|---|---|
| 682,196 | Great Britain | Nov. 5, 1952 |